(12) United States Patent
Bonnefois et al.

(10) Patent No.: US 11,884,997 B2
(45) Date of Patent: Jan. 30, 2024

(54) HOT ROLLED PLATE OR FORGING OF AN AUSTENITIC STEEL

(71) Applicant: ArcelorMittal, Luxembourg (LU)

(72) Inventors: Bernard Bonnefois, Le Breuil (FR); Amelie Fanica, Cersot (FR); Lionel Coudreuse, Saint-Etienne (FR); Tassa Oriana, Rome (IT); Johannes Cornelis Van Wortel, Ga Brummen (NL)

(73) Assignee: ArcelorMittal, Luxembourg (LU)

( * ) Notice: Subject to any disclaimer, the term of this patent is extended or adjusted under 35 U.S.C. 154(b) by 0 days.

(21) Appl. No.: 17/699,324

(22) Filed: Mar. 21, 2022

(65) Prior Publication Data

US 2023/0040035 A1 Feb. 9, 2023

Related U.S. Application Data

(63) Continuation of application No. 15/991,428, filed on May 29, 2018, now abandoned, which is a continuation of application No. 13/386,141, filed as application No. PCT/IB2010/001759 on Jul. 20, 2010, now abandoned.

(30) Foreign Application Priority Data

Jul. 22, 2009 (EP) .................................. 09290581

(51) Int. Cl.
*C22C 38/00* (2006.01)
*C22C 38/46* (2006.01)
*C22C 38/54* (2006.01)

(52) U.S. Cl.
CPC ............ *C22C 38/001* (2013.01); *C22C 38/46* (2013.01); *C22C 38/54* (2013.01); *C21D 2211/001* (2013.01)

(58) Field of Classification Search
CPC ...................................................... C22C 38/00
See application file for complete search history.

(56) References Cited

U.S. PATENT DOCUMENTS

| 2,750,283 | A | 6/1956 | Loveless |
| 3,649,376 | A | 3/1972 | Decroix |
| 4,897,132 | A | 1/1990 | Yamamoto et al. |
| 7,377,989 | B2 | 5/2008 | Matsuo |
| 8,133,431 | B2 | 3/2012 | Osuki et al. |
| 2003/0136482 | A1 | 7/2003 | Mayerbock et al. |
| 2004/0206427 | A1 | 10/2004 | Iseda et al. |
| 2006/0243356 | A1 | 11/2006 | Oikawa et al. |
| 2010/0230011 | A1 | 9/2010 | Oikawa et al. |

FOREIGN PATENT DOCUMENTS

| EP | 1637785 A1 | 3/2006 |
| EP | 1645649 A1 | 4/2006 |
| EP | 1605072 B1 | 9/2012 |
| GB | 1365773 A | 9/1974 |
| JP | S60116750 A | 6/1985 |
| JP | S61201760 A | 9/1986 |
| JP | H0550288 A | 3/1993 |
| JP | H09310157 A | 12/1997 |
| RU | 2246553 C2 | 2/2005 |
| SU | 1342940 A1 | 10/1987 |
| WO | 2004083476 A1 | 9/2004 |
| WO | 2009044802 A1 | 4/2009 |

OTHER PUBLICATIONS

Espy R. H. Weldability of Nitrogen-Strengthened Stainless Steels // Welding Research Supplement.—May 1982.—Pags 149-156.

*Primary Examiner* — Christopher S Kessler
(74) *Attorney, Agent, or Firm* — Davidson, Davidson & Kappel, LLC

(57) ABSTRACT

A hot rolled plate or forging of an austenitic steel not susceptible to relaxation cracking is provided. The hot rolled plate or austenitic steel includes a composition having in percentages by weight: $0.019\% \leq C \leq 0.030\%$, $0.5\% \leq Mn \leq 2\%$, $0.1\% \leq Si \leq 0.75\%$, $Al \leq 0.25\%$, $18\% \leq Cr \leq 25\%$, $14\% \leq Ni \leq 17\%$, $1.5\% \leq Mo \leq 3\%$, $0.001\% \leq B \leq 0.008\%$, $0.25\% \leq V \leq 0.35\%$, $0.23\% \leq N \leq 0.27\%$, the balance being iron and unavoidable impurities, $Ni(eq.) \geq 1.11 \ Cr(eq.) - 8.24$, $Cr(eq)=Cr+Mo+1.5Si+5V+3Al+0.02$, $Ni(eq)=Ni+30C+x(N-0.045)+0.87$; $x=30$ for $N \leq 0.2$, $x=22$ for $0.2 < N \leq 0.25$, $x=20$ for $0.25 < N \leq 0.35$.

22 Claims, No Drawings

HOT ROLLED PLATE OR FORGING OF AN AUSTENITIC STEEL

CROSS REFERENCE TO RELATED APPLICATIONS

This is a continuation of U.S. application Ser. No. 15/991,428 filed on May 29, 2018, published as U.S. 2018/0274067 A1, which is a continuation of U.S. application Ser. No. 13/386,141 filed on Jun. 4, 2012, published as U.S. 2012/0237389 A1 on Sep. 20, 2012 which is a national phase of PCT/IB2010/001759 filed on Jul. 20, 2010 which claims priority to European Patent Application EP 09290581.9, filed on Jul. 22, 2009. All of the above applications are hereby incorporated by reference herein.

The invention relates to austenitic heat resistant steel and its use for the fabrication of installations such as reactor vessels, forgings and pipelines operating at temperatures above 550° C. In particular, the invention pertains to a steel which is not susceptible to stress relaxation cracking.

BACKGROUND OF THE INVENTION

Various industries, such as for example chemical industry, are using heat resistant steel types for applications operating at temperatures between 550 and 900° C., often under high pressures. The main degradation mechanisms at these temperatures are creep, chemical attack/oxidation and stress relaxation cracking. The first two degradation mechanisms have been thoroughly studied and taken into account in construction codes. Materials such as AISI 304H steel (whose main alloying elements are 18-20% Cr, 8-10.5% Ni), AISI 316H (16-18% Cr, 10-14% Ni, 2-3% Mo), 800H (19-23% Cr, 30-35% Ni) display high creep fracture strength. Under this respect, alloy 800H is favorable because it displays high fracture strength in the range 550-950° C. However, alloy 800H is expensive due to its high nickel content. In addition, the three aforementioned alloys are susceptible to stress relaxation cracking (SRC). Cracking occurs in intergranular mode, i.e. at grain boundaries. This phenomenon does not occur when susceptible alloys are subjected to thermal treatments to reduce residual stresses. It has been shown that heat treatments between 875 and 980° C. are effective to avoid SRC. However, these treatments at high temperature can hardly be performed on industrial sites. The components in the chemical industry are generally very complex and huge. It is also a cost consuming and risky procedure.

SUMMARY OF THE INVENTION

Thus, there is a need for a heat-resisting steel with high creep and oxidation resistance at high temperature, non-susceptible to stress relaxation cracking.

An object of the present invention may provide a heat resistant steel which is intrinsically not susceptible for relaxation cracking, so that extra heat treatments after manufacturing processes can be avoided.

Another object of the invention may provide a steel composition having excellent creep and oxidation properties in the large range of temperature range of 550 up to 900° C., especially in the temperature range between 550 and 750° C.

Another object of the invention may provide a steel composition which has high ductility at high temperature and which displays also satisfactory toughness at ambient temperature after a holding at high temperature.

A further object of the invention may provide a steel composition with limited amount of costly elements of additions such as nickel.

As a result of numerous tests and investigations, the inventors have found that when some elements, and in particular carbon, aluminum, chromium, nickel, molybdenum, boron, vanadium, nitrogen, are present in suitable ranges in steel, the aim of the invention may be attained.

The structure of the steel according to the invention is fully austenitic.

For this purpose, the subject of the invention provides an austenitic steel not susceptible to relaxation cracking, with composition comprising, in percentages by weight: $0.019\% \leq C \leq 0.030\%$, $0.5\% \leq Mn \leq 3\%$, $0.1\% \leq Si \leq 0.75\%$, $Al \leq 0.25\%$, $18\% \leq Cr \leq 25\%$, $12\% \leq Ni \leq 20\%$, $1.5\% \leq Mo \leq 3\%$, $0.001\% \leq B \leq 0.008\%$, $0.25\% \leq V \leq 0.35\%$, $0.23\% \leq N \leq 0.27\%$, the balance being iron and unavoidable impurities, and wherein: $Ni(eq.) \geq 1.11\ Cr(eq.) - 8.24$, wherein: $Cr(eq) = Cr + Mo + 1.5Si + 5V + 3Al + 0.02$, $Ni(eq) = Ni + 30C + x(N - 0.045) + 0.87$ wherein: $x = 22$ for $0.23\% \leq N \leq 0.25\%$, $x = 20$ for $0.25\% < N \leq 0.27\%$.

According to a preferred embodiment, the steel composition may comprise: $14\% \leq Ni \leq 17\%$.

Another subject of the invention may provide a steel product with composition above and wherein the elongation is higher than 30% at the temperature of 750° C.

Another subject of the invention may provide a steel product with composition above wherein the lifetime under 36 MPa at 750° C. is higher than $0.5 \times 10^5$ h.

Another subject of the invention may provide the use of a steel product having a composition above, for the fabrication of reactor vessels, forgings and pipelines.

As regarding to steel composition, carbon is an effective element for forming fine $M_{23}C_6$ precipitates which will increase tensile and creep strength. When the carbon content is 0.019% in weight or less, these effects are not sufficient. But when carbon content exceeds 0.030%, excessive carbides precipitation occurs and the steel becomes susceptible to SRC. Furthermore, toughness is lowered as a consequence of the increased precipitation of carbonitrides, coarse sigma phases and $M_{23}C_6$ carbides.

Manganese is added as a deoxidizer of the molten steel. Manganese combines also with sulphur, thus improving hot workability. These effects are obtained when manganese content is higher than 0.5% in weight. When it exceeds 3%, the kinetics of formation of some undesirable phases, such as brittle sigma phase, is increased. A preferable range for manganese is 1.3-1.7%.

As manganese, silicon has also a deoxidizing effect. It enhances also oxidation resistance. Below 0.1%, these effects are not achieved. But when silicon exceeds 0.75%, steel toughness decrease. A preferable range for silicon is 0.2-0.55%.

Aluminum is a strong deoxidizing element of the molten steel. But when aluminum exceeds 0.25% in weight, precipitation of intermetallic is promoted at elevated temperatures during long holding times and toughness is decreased. The precipitation of undesirable AlN is also promoted. Thus, aluminum is maintained less than 0.25%. Preferably, the aluminum content is lower than 0.2% in order to fully avoid a precipitation of AlN.

Chromium improves oxidation resistance between 550 and 950° C. and increases strength with the formation of carbonitrides. If the chromium content is less than 18% in weight, these effects are not achieved. On the other hand, if the chromium content exceeds 25%, the formation of intermetallic phases such as brittle sigma phase is promoted. Furthermore, as chromium content increases, the nickel content has to be also increased in order to keep a fully austenitic structure, thus yielding high production costs. A preferable content range for chromium is 19-21%.

Nickel is a gammagene element ensuring the stability of the austenitic structure together with other elements such as carbon and nitrogen. Taking into account the chromium content together with the other ferrite stabilizing elements such as molybdenum, the nickel content has to be higher than 12% in order to form a stable austenitic structure. If the nickel content exceeds 20%, its effect is saturated and production cost increases unnecessarily. A preferred range for nickel is 14-17%.

Molybdenum increases the strength at elevated temperatures as well as the resistance to hot cracking. Molybdenum additions less than 1.5% are not sufficient in order to obtain the desired creep strength at high temperature. But when Mo exceeds 3%, the effect for enhancing strength is saturated, and hot workability decreases. Precipitation of sigma-phase may also occur, reducing room-temperature ductility. A preferred range for molybdenum content is 2.2 to 2.8%.

At content higher than 0.001% in weight, boron increases the creep resistance by the precipitation of fine carbonitrides or borides in the matrix and strengthens also the grain boundaries. Above 0.008%, the risk of hot cracking is increased and weldability is reduced. The most preferable range for boron is 0.003 to 0.005%.

Vanadium is an important element in the invention since it forms fine intragranular carbonitrides. Precipitation occurs also under the form of vanadium borides. These precipitates improve creep strength and toughness. These effects are optimally obtained when vanadium content is not less than 0.25% in weight. But when vanadium exceeds 0.35%, coarse carbonitrides and sigma phase tend to reduce too much the strengthening effect and the room-temperature ductility.

As carbon, nitrogen is an effective element for increasing yield, tensile and creep strengths. As a gammagene element, it contributes also to the formation of a fully austenitic structure. Less than 0.23%, nitrogen cannot form carbonitrides in a sufficient and optimum quantity for obtaining these effects. On the other hand, more than 0.27% nitrogen yields too much the formation of coarse nitrides which reduce temperature ductility and toughness. Nitrogen is also restricted together with aluminum for preventing AlN precipitation.

Apart from iron, steel of the invention may contain incidental impurities resulting from the elaboration or smelting. Among these impurities, sulphur, phosphorus and oxygen have adverse effects on ductility, either at ambient temperature or at high temperature, and on weldability. Thus, they should be restricted at quantities as low as possible. Preferably, sulphur should be lower than 0.005%, phosphorus lower than 0.030%, and oxygen lower than 0.010% in weight.

The steels according to the invention have an austenitic microstructure. Thus, no further decomposition of ferrite in brittle sigma phase is susceptible to occur at elevated temperatures. A fully austenitic structure is obtained when the "chromium equivalent" (Cr(eq)) and the "nickel equivalent" (Ni(eq)) are such as:

Ni(eq.)≥1.11 Cr(eq.)−8.24, wherein:
Cr(eq)=Cr+Mo+1.5Si+5V+3Al+0.02
Ni(eq)=Ni+30C+x(N−0.045)+0.87 wherein:
x=22 for 0.23%≤N≤0.25%
x=20 for 0.25%<N≤0.27%
all the elements being expressed in weight %.

Thanks to vanadium addition, carbon and nitrogen contents, vanadium carbonitrides are present in the range of 550-950° C. These stable carbonitrides have a positive effect on creep strength without impairing SRC susceptibility.

The invention covers besides various products which can be obtained by the processes as well as their uses, such as:

Quarto hot rolled plates, and presenting a thickness included between 5 and 100 mm, Forgings which can be used for the manufacturing of flanges or connection.

DETAILED DESCRIPTION

The following examples are presented as an illustration of the present invention. It should be understood, however, that the invention is not limited to the particular details in these examples.

EXAMPLE

Steel compositions were elaborated, of which elements are indicated on table 1 with their compositions in weight %. Compositions of steels A and B correspond to the invention. Ingots were cast, pre-forged under the form of flat products and hot-rolled down to plates with thicknesses ranging from 15 to 40 mm. The plates were solution-annealed at 1100° C. and water-quenched.

Steels with references C to I are comparative steels.

TABLE 1

Steel chemical compositions (% weight).
Underlined values: non conform to the invention

|  | Steel Reference | C (%) | Mn (%) | Si (%) | Al (%) | Cr (%) | Ni (%) | Mo (%) | B (%) | V (%) | N (%) | Other elements (%) |
|---|---|---|---|---|---|---|---|---|---|---|---|---|
| Invention | A | 0.023 | 1.44 | 0.26 | 0.005 | 19.87 | 14.61 | 2.49 | 0.0034 | 0.31 | 0.23 | S: 0.0017 P: 0.014 O: 0.007 |
|  | B | 0.019 | 1.49 | 0.51 | 0.010 | 20.1 | 14.82 | 2.51 | 0.004 | 0.30 | 0.26 | S: 0.001 P: 0.003 O: 0.004 |
| Reference | C | 0.02 | 1.51 | 0.49 | 0.005 | 20 | <u>11.9</u> | — | 0.0033 | — | 0.276 | S: 0.001 P: 0.004 O: 0.006 |

TABLE 1-continued

Steel chemical compositions (% weight).
Underlined values: non conform to the invention

| Steel Reference | C (%) | Mn (%) | Si (%) | Al (%) | Cr (%) | Ni (%) | Mo (%) | B (%) | V (%) | N (%) | Other elements (%) |
|---|---|---|---|---|---|---|---|---|---|---|---|
| D | 0.02 | 1.5 | 0.52 | <u>0.29</u> | 20 | 13.3 | 2.54 | 0.004 | — | 0.25 | S: 0.002<br>P: 0.005<br>O: 0.004 |
| E | <u>0.072</u> | 1.47 | 0.50 | 0.005 | 20.1 | 12.1 | 2.52 | 0.0044 | — | 0.267 | S: 0.001<br>P: 0.002<br>O: 0.006 |
| F | 0.022 | 1.50 | 0.51 | 0.005 | <u>25.9</u> | 17.3 | — | 0.0037 | — | <u>0.351</u> | S: 0.002<br>P: 0.003<br>O: 0.006 |
| G | <u>0.06</u> | 1.04 | 0.53 | 0.23 | 20.6 | <u>31.3</u> | <u>0.16</u> | 0.0013 | <u>0.065</u> | <u>0.015</u> | S: 0.005<br>P: 0.012<br>O: 0.001 |
| H | 0.016 | 1.71 | 0.38 | 0.015 | <u>17.0</u> | 12.86 | 2.26 | 0.004 | <u>0.049</u> | <u>0.12</u> | S: 0.005<br>P: 0.020<br>O: 0.002 |
| I | <u>0.064</u> | 1.71 | 0.39 | 0.030 | 18.2 | <u>10.5</u> | — | — | — | 0.05 | S: 0.005<br>P: 0.035<br>O: 0.002 |

The following tests were performed:

Tensile tests at 750 and 850° C. in order to determine the tensile strength (TS) and the total elongation (A) An elongation higher than 30% is desired in order to attest a good ductility at high temperature.

Charpy V tests were performed in the following condition: After thermal treatment (ageing) at 650° C. for 1000 hours, the plates were cooled down to ambient temperature and tested in such condition. Specimens were machined in the plates and tested at 20° C. on a Charpy V pendulum. A Charpy V fracture energy greater than 100 Joules is desired in order to ensure satisfactory toughness. This criterion is severe since the ageing usually corresponds to a marked toughness drop for this kind of materials.

Isocreep tests were performed for determining rupture lifetime at 750° C. under a stress level of 36 MPa, and at 850° C. under a stress level of 16 MPa. A creep rupture lifetime superior or equal to $0.5 \times 10^5$ h at 750° C. under 36 MPa is desired Total scale thickness after 3000 h at 750° C. was measured on some specimens, indicating the level of resistance to the oxidation at high temperatures.

Results of tensile, creep and Charpy V tests, scale thickness, are indicated in table 2.

TABLE 2

Results obtained on steels compositions of table 1

| | Alloy | TS at 750° C. (MPa) | TS at 850° C. (MPa) | A at 750° C. (%) | Charpy energy after 1000 h at 650° C. (Joules) | Lifetime at 750° C. creep stress 36 MPa (x$10^5$ h) | Lifetime at 850° C. creep stress 16 MPa (x$10^5$ h) | Scale thickness after 750° C.-3000 h (micrometers) |
|---|---|---|---|---|---|---|---|---|
| Invention | A | n.d | n.d | 50 | 133 | n.d | n.d | 50 |
| | B | 407 | 269 | 40 | 130 | 1 | 0.8 | n.d |
| Reference | C | 300 | 175 | <u>30</u> | 126 | <u>0.1</u> | 0.02 | n.d |
| | E | 370 | 275 | 50 | <u>41</u> | 1 | 0.7 | n.d |
| | F | 350 | 220 | 35 | <u>61</u> | <u>0.3</u> | 0.1 | n.d |
| | G | 270 | 150 | 40 | 182 | 1 | 1 | 150 |
| | H | 275 | nd | 65 | 166 | <u>0.25</u> | n.d. | n.d |

The susceptibility to relaxation cracking was evaluated by the following procedure: After three-point bending of at ambient temperature, full-thickness specimens were submitted to a constant strain at temperature ranging from 500 to 900° C. during 150 hours. Load variation was recorded and an eventual damage by relaxation cracking was assessed by examining polished cross sections of the specimens. Some of them showed no damage or very minor cavities: these were classified as Non-Susceptible ("NS"). On the other hand, specimens with micro- or macro-cracks and cavities reveal a susceptibility ("S") to SRC. For the purpose of use in industrial conditions, a non-susceptibility in the range of 550 to 900° C., and particularly in the range of 550-750° C., is desired. Results of the SRC tests are indicated in table 3.

TABLE 3

Results of stress relaxation cracking tests at different temperatures on steel compositions of Table 1.

|  | Alloy | 500° C. | 550° C. | 600° C. | 650° C. | 700° C. | 750° C. | 800° C. | 850° C. | 900° C. |
|---|---|---|---|---|---|---|---|---|---|---|
| Invention | A | NS | NS | NS | NS | NS | NS | NS | NS | NS |
|  | B | NS | NS | NS | NS | NS | NS | NS | NS | NS |
| Reference | C | n.d | n.d | S | S | S | n.d | n.d | n.d | n.d |
|  | E | n.d | n.d | S | S | S | n.d | n.d | n.d | n.d |
|  | F | n.d | n.d | S | S | S | n.d | n.d | n.d | n.d |
|  | G | NS | NS | S | S | S | NS | NS | NS | NS |
|  | H | NS | NS | NS | NS | NS | NS | NS | NS | NS |
|  | I | NS | NS | S | NS | NS | NS | NS | NS | NS |

S = Susceptible to SRC
NS = Non Susceptible to SRC
n.d.: Not determined

From the results above, steels according to the invention display a particular combination of properties: non susceptibility to relaxation cracking on the temperature range 500-900° C., excellent creep resistance, high ductility in a large range of temperatures. These steels display also good toughness at ambient temperature after a holding at high temperature, and limited scale thickness.

The susceptibility to hot cracking in welding for the steels according to the invention was also assessed by the following test : the surface of the plates was melted with Gas Tungsten Arc Welding with heat inputs ranging from 4.5 up to 10.3 kJ/cm and travelling speeds ranging from 5.7 up to 24.3 cm/mn. In all cases, no cracks were detected in the remelted material and in the Heat Affected Zones. Thus, the compositions according to the invention display good resistance to hot cracking.

By comparison, the results obtained on the reference steels are as follows:

Alloy C which is a reference steel without molybdenum and vanadium, is extremely susceptible to stress relaxation cracking since macro-cracks initiate even after a relaxation time of 75 h. Furthermore, the elongation at 750° C. is not satisfactory.

Alloy D does not contain vanadium and has an excessive aluminum content, thus leading to insufficient ductility at elevated temperature.

Alloy E has excessive carbon content and does not contain vanadium. As a consequence, precipitation of carbonitrides, coarse sigma-phase and $M_{23}C_6$ carbides occur, which cause Charpy energy reduction after 1000 h at 650° C. Furthermore, this alloy was susceptible to SRC, particularly at temperatures around 650° C.

Alloy F has excessive chromium content, but no molybdenum and no vanadium. As a consequence, intermetallic phases form and reduce Charpy toughness, and on the other hand this alloy is very susceptible to SRC.

Alloy G has excessive contents in carbon and nickel but insufficient contents in molybdenum, vanadium and nitrogen. Consequently, after treatments at 600-700° C., alloy G shows damage with SRC since macrocracks appear.

Even if the alloy H is not susceptible to SRC, its lifetime at 750° C. is less than the desired value of $0.5 \times 10^5$ h, due to its low contents in vanadium and nitrogen.

In accordance with its inadequate contents in carbon, nickel, molybdenum, boron, vanadium, nitrogen, alloy I is susceptible to SRC at 600° C.

The steels according to the invention are used with profit for the fabrication of installations such as reactor vessels, forgings and pipelines operating at temperatures above 550° C.

What is claimed is:

1. A hot rolled plate or forging of an austenitic steel non-susceptible to relaxation cracking, with composition comprising, in percentages by weight:
    0.019%≤C≤0.030%
    0.5%≤Mn≤3%
    0.1%≤Si≤0.75%
    Al≤0.25%
    18%≤Cr≤25%
    12%≤Ni≤20%
    1.5%≤Mo≤3%
    0.001%≤B≤0.008%
    0.25%≤V≤0.35%
    0.23%≤N≤0.27%,
    the balance being iron and unavoidable impurities, and wherein:
    Ni(eq.)≥1.11 Cr(eq.)−8.24, wherein:
    Cr(eq)=Cr+Mo+1.5Si+5V+3Al+0.02
    Ni(eq)=Ni+30C+x(N−0.045)+0.87 wherein:
    x=22 for 0.23%≤N≤0.25%
    x=20 for 0.25%<N≤0.27%; and
    a fully austenitic structure.

2. The hot rolled plate or forging with composition according to claim 1, wherein the hot rolled plate or forging is non-susceptible to stress relaxation cracking at temperatures from 500 to 900° C.

3. The hot rolled plate or forging with composition according to claim 1, wherein the hot rolled plate or forging is non-susceptible to stress relaxation cracking at temperatures from 550 to 750° C.

4. The hot rolled plate or forging with composition according to claim 1, wherein an elongation is higher than 30% at the temperature of 750° C.

5. The hot rolled plate or forging with composition according to claim 1, wherein a creep rupture lifetime under 36MPa at 750° C. is higher than $0.5 \times 10^5$ h.

6. Reactor vessels, forgings or pipelines comprising:
the hot rolled plate or forging as recited in claim 1.

7. The hot rolled plate or forging of the steel according to claim 1, wherein 14%≤Ni≤17%.

8. The hot rolled plate or forging of the steel according to claim 1, wherein the hot rolled plate has a thickness from 5 to 100 mm.

9. The hot rolled plate or forging of the steel according to claim 1, wherein the steel has a Charpy V fracture energy greater than 100 Joules.

10. A hot rolled plate or forging of an austenitic steel non-susceptible to relaxation cracking, with composition comprising, in percentages by weight:
0.019%≤C≤0.030%
0.5%≤Mn≤3%
0.1%≤Si≤0.75%
Al≤0.25%
18%≤Cr≤25%
14%≤Ni≤17%
1.5%≤Mo≤3%
0.001%≤B≤0.008%
0.25%≤V≤0.35%
0.23%≤N≤0.27%,
the balance being iron and unavoidable impurities, and wherein:
Ni(eq.)≥1.11Cr(eq.)−8.24, wherein:
Cr(eq)=Cr+Mo+1.5Si+5V+3Al+0.02
Ni(eq)=Ni+30C+x(N−0.045)+0.87 wherein:
x=22 for 0.23%≤N≤0.25%
x=20 for 0.25%<N≤0.27%.

11. The hot rolled plate or forging with composition according to claim 10, wherein the hot rolled plate or forging is non-susceptible to stress relaxation cracking at temperatures from 500 to 900° C.

12. The hot rolled plate or forging with composition according to claim 10, wherein the hot rolled plate or forging is resistant non-susceptible to stress relaxation cracking at temperatures from 550 to 750° C.

13. The hot rolled plate or forging with composition according to claim 10, wherein an elongation is higher than 30% at the temperature of 750° C.

14. The hot rolled plate or forging with composition according to claim 10, wherein a creep rupture lifetime under 36 MPa at 750° C. is higher than $0.5 \times 105^5$ h.

15. Reactor vessels, forgings or pipelines comprising:
the hot rolled plate or forging as recited in claim 1.

16. The hot rolled plate or forging of the steel according to claim 10, which has a fully austenitic structure.

17. The hot rolled plate or forging of the steel according to claim 10, wherein the hot rolled plate has a thickness from 5 to 100 mm.

18. The hot rolled plate or forging of the steel according to claim 10, wherein the steel has a Charpy V fracture energy greater than 100 Joules.

19. The hot rolled plate or forging with composition according to claim 10, wherein the composition comprises 18%≤Cr≤21%.

20. A hot rolled plate or forging of an austenitic steel non-susceptible to relaxation cracking, with composition comprising, in percentages by weight:
0.019%≤C≤0.030%
0.5%≤Mn≤3%
0.1%≤Si≤0.75%
Al≤0.25%
18%≤Cr≤25%
14%≤Ni≤17%
1.5%≤Mo≤3%
0.001%≤B≤0.008%
0.25%≤V≤0.35%
0.23%≤N≤0.27%,
the balance being iron and unavoidable impurities, and wherein:
Ni(eq.)≥1.11 Cr(eq.)−8.24, wherein:
Cr(eq)=Cr+Mo+1.5Si+5V+3Al+0.02
Ni(eq)=Ni+30C+x(N−0.045)+0.87 wherein:
x=22 for 0.23%≤N≤0.25%
x=20 for 0.25%<N≤0.27%; and
the hot rolled plate or forging being non-susceptible to stress relaxation cracking at temperatures from 550 to 750° C.

21. The hot rolled plate or forging with composition according to claim 20, wherein a creep rupture lifetime under 36 MPa at 750° C. is higher than $0.5 \times 10^5$ h.

22. The hot rolled plate or forging with composition according to claim 19, wherein the composition comprises 19%≤Cr≤21%.

* * * * *